Patented July 12, 1932

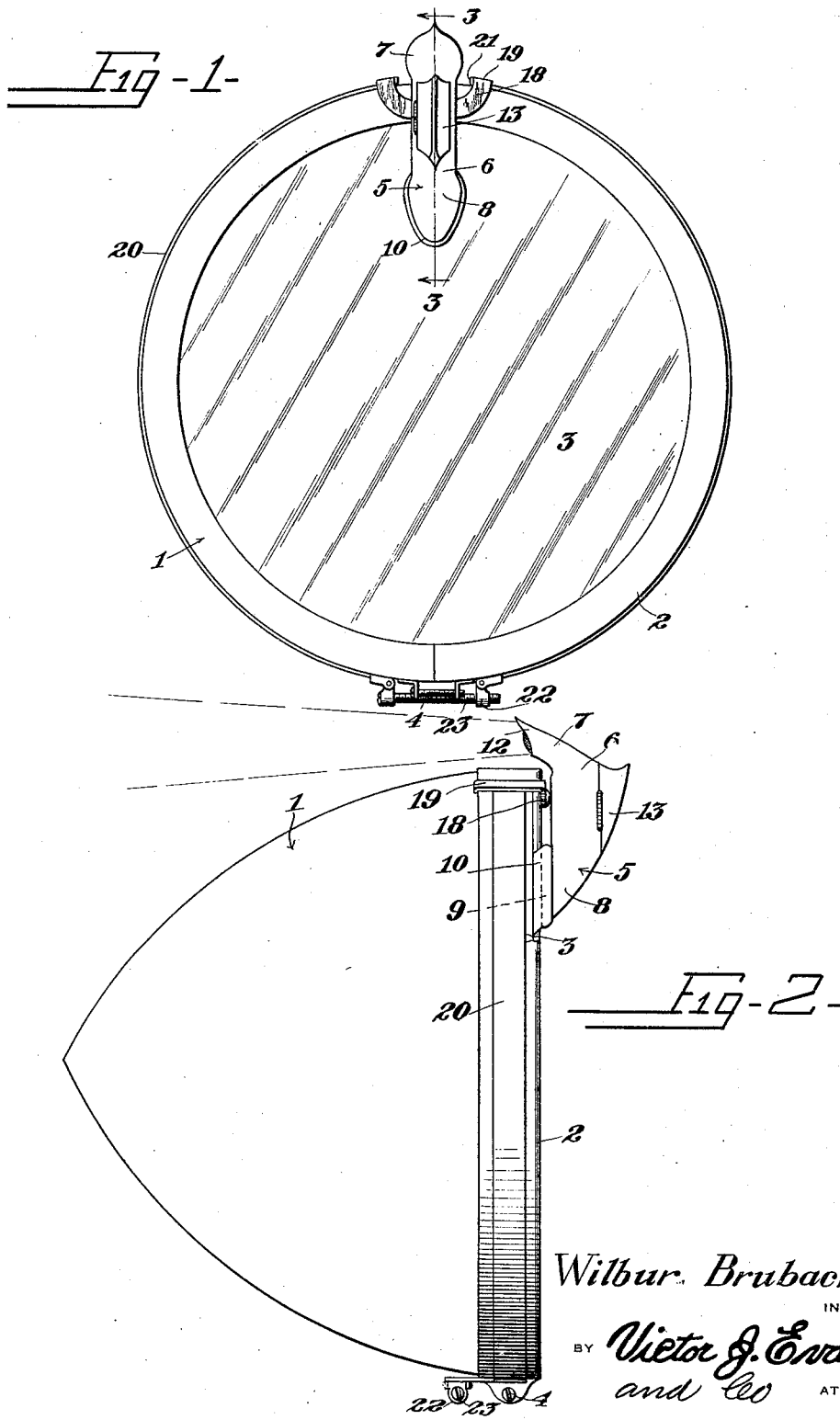

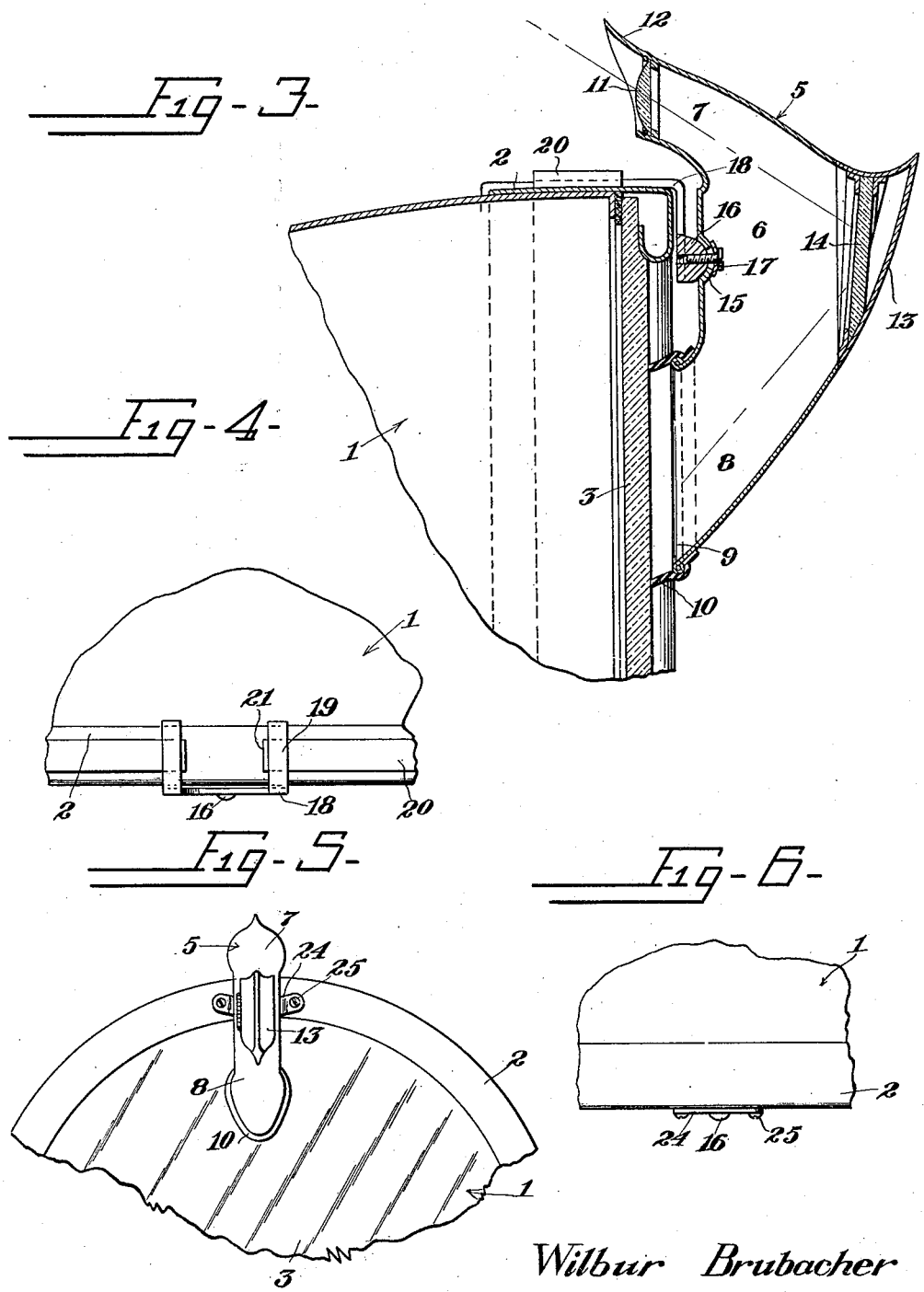

1,867,493

UNITED STATES PATENT OFFICE

WILBUR BRUBACHER, OF BRIDGEPORT, ONTARIO, CANADA

HEADLIGHT SIGNAL

Application filed May 8, 1931. Serial No. 536,018.

This invention relates to headlight signals for motor vehicles and has for the primary object, the provision of a device of the above stated character which may be easily and quickly applied to the headlight of a motor vehicle, whereby the operator in the driver's seat may at a glance determine if the lamp of the headlight is illuminated.

Another object of this invention is the provision of an attachment which will harmonize with the headlight and having means for reflecting a small portion of the light rays from the lamp toward the driver's seat, thus allowing the operator to easily determine at an instant when the lamp becomes accidentally extinguished.

A further object of this invention is the provision of a headlight signal of the above stated character which will be simple, durable and efficient, and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a headlight with a signal applied thereto and constructed in accordance with my invention.

Figure 2 is a side elevation illustrating the same.

Figure 3 is a fragmentary sectional view illustrating the means of adjusting the attachment relative to the headlight and showing the reflecting means.

Figure 4 is a fragmentary plan view illustrating a portion of the clamping band and its attachment to the bracket of the signal.

Figure 5 is a fragmentary front elevation illustrating a modified form of my invention.

Figure 6 is a fragmentary plan view of the same.

Referring in detail to the drawings the numeral 1 indicates a conventional type of headlight having the usual rim 2 carrying the lens 3. The rim 2 is of the split type and held in adjusted position upon the body of the lamp by fastening means 4.

The casing 5 is associated with the lens 3 and the demountable rim of the headlight as shown in Figure 1 and includes a body portion 6 terminating into angularly disposed tubular portions 7 and 8 and the diameter of the tubular portion 8 is greater than the diameter of the tubular portion 7 and has its free edge flared to form a retaining flange 9 over which is mounted a cushioning member 10 adapted to contact with the outer face of the lens 3, while the tubular portion 7 has mounted therein a lens 11 and is cut away to form a curved shield 12 for the lens 11. The lens 11 is disposed above the headlight and in clear view of the operator occupying the driver's seat of the motor vehicle to which the headlight is attached.

The portion of the body 6 of the casing between the angularly related tubular portions 7 and 8 and in the front wall of the casing is cut away to form an opening closed by a hinged door 13 and in which is mounted a reflector 14 for the purpose of reflecting the light rays from the electric lamp within the headlight through the lens 11, so that the operator may determine at a glance when the lamp becomes accidentally extinguished. The curved shield 12 prevents the light rays from being noticeable laterally of the headlight.

The body portion 6 of the casing 5 is provided with a pocket or seat 15 to receive a semi-spherical shaped member 16 which carries a fastener element 17 extending through the opening in the seat 15 for the purpose of adjustably securing the casing 5 relative to the headlight and lens 3 thereof. The element 16 and fastener 17 are carried by a bracket 18 including angularly disposed arms 19, the free ends of which are adapted to engage the rear edge of the rim 2 of the headlight. A split clamp 20 surrounds the rim 2 with a pair of ends passed under the arms 19 and bent angularly as shown at 21 and the other ends of the clamp are provided with screw-threaded ears 22 for receiving a fastening bolt 23 whereby the clamp may be tightly secured about the rim and in doing so the bracket 18 is firmly secured in position for supporting the casing 5 in proper relation to the lens of the headlight.

The clamp 20 is readily bendable besides conforming to the contour of headlights of different shapes or designs.

By having the door 13 and the reflector 14 mounted therein provides a construction which will permit a person to obtain easy access to the interior of the casing 5 when desiring to adjust the casing relative to the headlight through the operation of the fastener 17 and the adjustment of the element 16 within the socket 15.

As shown in Figures 5 and 6, the casing 5 may have formed thereon angularly disposed arms 24 having their free ends apertured to receive fasteners 25 for the purpose of securing the arms to the rim of the headlight.

While I have shown and described the preferred embodiment of my invention, it will be understood that minor changes in construction, combination and arrangement of parts may be made without departing from the spirit and scope of my invention, as claimed.

Having thus described my invention, what I claim is:

A reflecting device for headlights comprising a hollow member adapted to be arranged exteriorly of a headlight and including integral portions arranged angularly to each other, a cushion element secured to the end of one of said portions and contacting with a lens of the headlight, said other portion having the end thereof disposed in a plane laterally of the headlight, a reflector in said member and located at the juncture of said angularly related portions, said member having an apertured seat therein, a fastener extending through the apertured seat, a semispherical shaped supporting element adjustably secured to the seat by the fastener to permit adjustment of the hollow member relative to the lens of the headlight, and means detachably securing the supporting element to the headlight.

In testimony whereof I affix my signature.

WILBUR BRUBACHER.